United States Patent [19]
Alkire et al.

[11] Patent Number: 6,123,048
[45] Date of Patent: Sep. 26, 2000

[54] LITTER BOX FILTER SYSTEM

[76] Inventors: William E. Alkire, 7749 E. Solano, Scottsdale, Ariz. 85250; David B. Benz, 6205 E. Sage, Paradise Valley, Ariz. 85253

[21] Appl. No.: 09/074,145

[22] Filed: May 7, 1998

[51] Int. Cl.[7] .................................................. A01K 29/00
[52] U.S. Cl. ......................... 119/500; 119/163; 119/165
[58] Field of Search ..................................... 119/500, 163, 119/161, 165, 166; 454/187, 207, 208, 242, 243, 250

[56] References Cited

U.S. PATENT DOCUMENTS

| | | | |
|---|---|---|---|
| 4,095,559 | 6/1978 | Griffith | 119/165 |
| 5,044,325 | 9/1991 | Miksitz | 119/165 |
| 5,134,972 | 8/1992 | Compagnucci | 119/165 |
| 5,134,973 | 8/1992 | Sarullo | 119/165 |
| 5,140,948 | 8/1992 | Roberts | 119/165 |
| 5,289,800 | 3/1994 | Walton | 119/166 |
| 5,307,761 | 5/1994 | Berger, III et al. | 119/165 |
| 5,315,964 | 5/1994 | Mimms et al. | 119/165 |
| 5,511,513 | 4/1996 | Baron et al. | 119/163 |
| 5,564,364 | 10/1996 | Kovacs et al. | 119/163 |
| 5,636,594 | 6/1997 | Pina | 119/165 |
| 5,655,478 | 8/1997 | Kiera | 119/165 |
| 5,738,040 | 4/1998 | Simmons | 119/165 |
| 5,853,445 | 12/1998 | Wong et al. | 55/343 |

*Primary Examiner*—Peter M. Poon
*Assistant Examiner*—Yvonne R. Abbott

[57] ABSTRACT

An exhaust filter system, in an animal habitation structure, for example, for cats, may be retrofit to a roof with a ventilation hole. The filter system has a housing provided with an inlet and an outlet, an electric fan mounted to move a current of air from the inlet through a filter, received in a slot provided in the housing. The filter is made of any suitable material, but is preferably activated charcoal. An important feature of the invention is the moldable membrane for connecting the inlet to the filter housing to the aperture in the roof, which is a moldable, flexible rubber or other plastic membrane, preferably polyurethane rubber, affixed to the inlet borders of the exhaust system and laid upon the roof, capable of conforming to the surface contour of almost any roof and covering, but not affixed to, the ventilation hole in the roof, to form a substantially air-tight seal with the roof. There may be also a sensor connected to the electric fan for detecting the presence of an animal in the litter box, to activate the electric fan when an animal is present in the litter box and deactivate the fan when the animal leaves the litter box.

An additional object and feature of the invention is that exact registration of the moldable membrane for communication between the filter system and the ventilation hole in the roof is not required.

It is a further feature of the invention that the system need not be permanently attached to the roof, but can be laid on the roof to cover the ventilation hole and make a substantially air tight seal with the roof of the habitation without resorting to glues or nails and caulking.

4 Claims, 2 Drawing Sheets

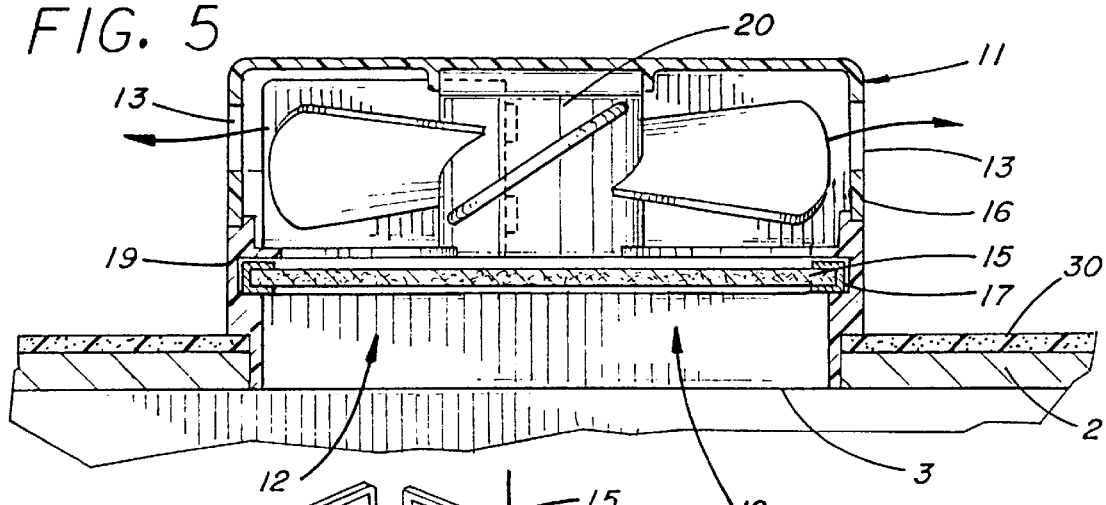
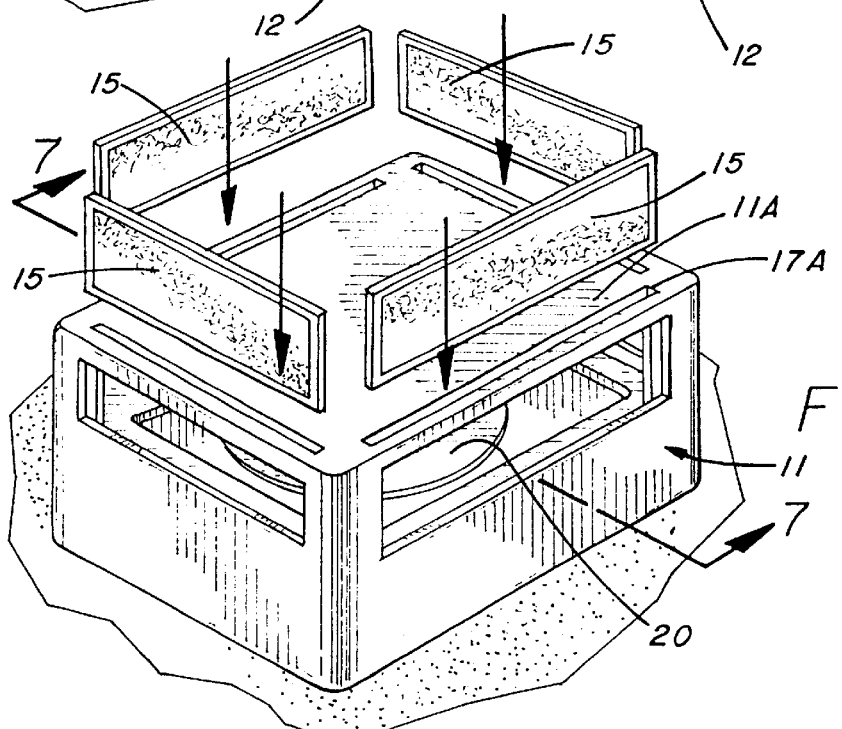
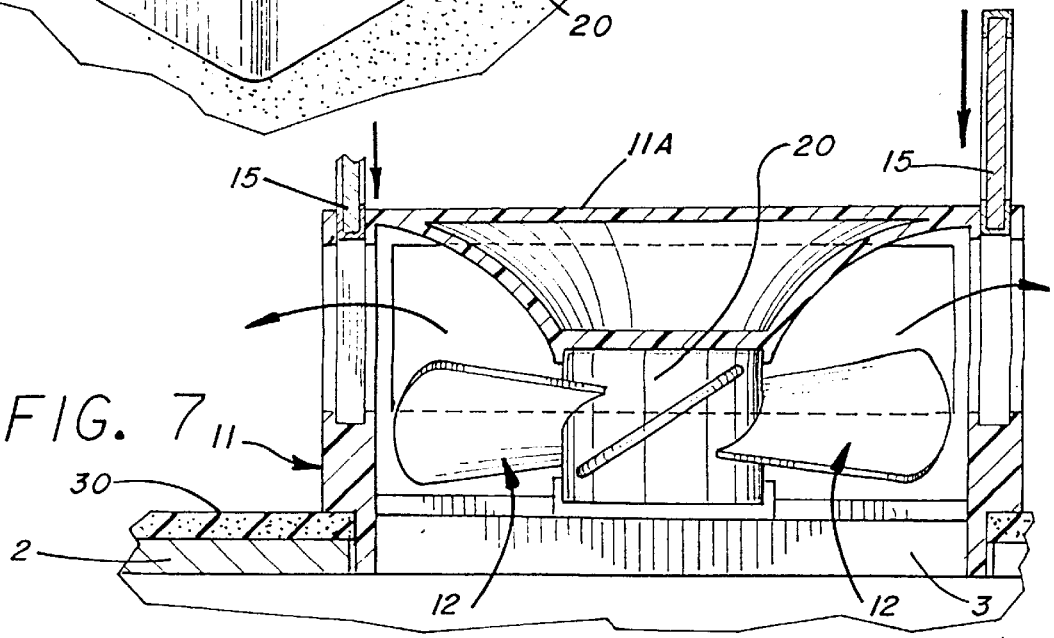

LITTER BOX FILTER SYSTEM

BACKGROUND OF THE INVENTION

1. Field of the Invention

The invention relates to animal housing of various types that require treatment of animal odors, and to devices for deodorizing animal habitation structures wherein an exemplary use is for cat habitations with litter boxes.

The invention further relates to devices for exhausting and/or filtering the air of animal habitations.

2. Description of the Related Art

The need to control animal odors has inspired a wide array of inventions. Today, animal odor control devices are well known and exist in many varieties. Walton, U.S. Pat. No. 5,289,800 discloses a passive ventilation system. Warm air is deodorized by a charcoal filter as it rises from the animal housing and passes through the filter in the housing's roof Griffith, U.S. Pat. No. 4,095,559, discloses an active ventilation system. Air in the animal housing is vented away from the housing by an electric fan connected to a tubular exhaust conduit. The Griffith patent, as well as Miksitz, U.S. Pat. No. 5,044,325, and Roberts, U.S. Pat. No. 5,140,948 disclose odor control devices which are permanently fixed to the animal housing. This design limits the utility of the odor control device to that specific animal housing. The invention of this patent is an active odor control device separate from the animal housing which can retrofit different animal housings.

FEATURES OF THE INVENTION

It is an object and a feature of this invention to provide an exhaust and filter system for attachment to an animal habitation structure, which system may be retrofit to existing structures which have ventilation holes in the roofs or which can be provided with ventilation holes.

An additional object and feature of the invention is that exact registration of the means for communication between the filter system and the ventilation hole in the roof is not required.

It is a further feature of the invention that the system need not be permanently attached to the roof, but can be laid on the roof to cover the ventilation hole and make a substantially air tight seal with the roof of the habitation without resorting to glues or nails and caulking.

SUMMARY OF THE INVENTION

The invention provides an exhaust filter system to be installed and used in an animal habitation structure. Such structures have a roof with a ventilation hole which is either built in or which may be constructed. The system may be easily adapted to retrofit any such structures presently on the market.

The exhaust/filter system has a housing provided with an inlet and an outlet. Within the housing there is an electric fan mounted operable to move a current of air from the inlet through a filter which may be of any suitable material, preferably activated charcoal. A slot is provided in the housing for removably receiving the filter. An important feature of the invention is the means for connecting the inlet to the filter housing in the exhaust system to the aperture in the roof.

The means for accomplishing this result is a moldable, flexible plastic membrane, resting upon the roof, affixed to the inlet of the exhaust system and covering, but not affixed to, the ventilation hole in the roof. Thus it forms a substantially air-tight seal with the roof by merely laying the membrane in place. The membrane, as an adapting means, is capable of conforming to the surface contour of almost any roof, to form a substantially air tight seal when positioned on the roof. The membrane is preferably a polyurethane rubber mat.

An additional object and feature of the invention is that exact registration of the means for communication between the filter system and the ventilation hole in the roof is not required.

It is a further feature of the invention that the system need not be permanently attached to the roof, but can be laid on the roof to cover the ventilation hole and make a substantially air tight seal with the roof of the habitation without resorting to glues or nails and caulking.

By this arrangement, the electric fan in operation moves air freely from inside the animal structure through the ventilation hole and into the exhaust system and through the exhaust filter and thence to the ambient atmosphere in the room or outside air.

There may be also provided in the enclosed exhaust system a sensing means operably connected to the electric fan for detecting the presence of an animal in the litter box. The sensing means activates is set to activate the electric fan when an animal is present in the litter box and deactivate the fan when the animal leaves the litter box.

BRIEF DESCRIPTION OF THE DRAWINGS

Turning now to the drawings in which presently preferred embodiments of the invention are depicted.

FIG. 5 is a sectioned view of the enclosure of FIG. 2 taken along the line 5—5;

FIG. 6 is an exploded view of an alternative embodiment of filter retention means;

FIG. 7 is a sectioned view of the enclosure of FIG. 6 taken along the line 7—7;

DETAILED DESCRIPTION OF THE PREFERRED EMBODIMENTS

Figure 1:
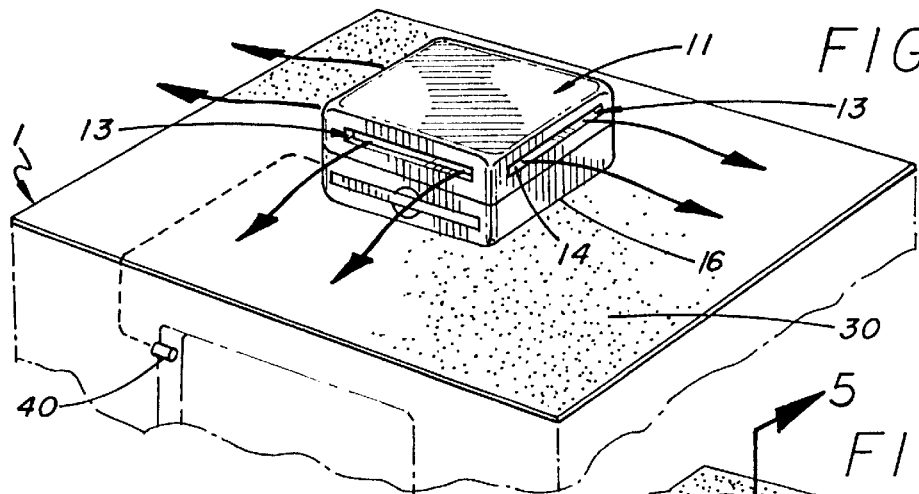
FIG. 1 is a view of the fan enclosure sealed to the roof of the housing by means of the apron.
Figure 2:
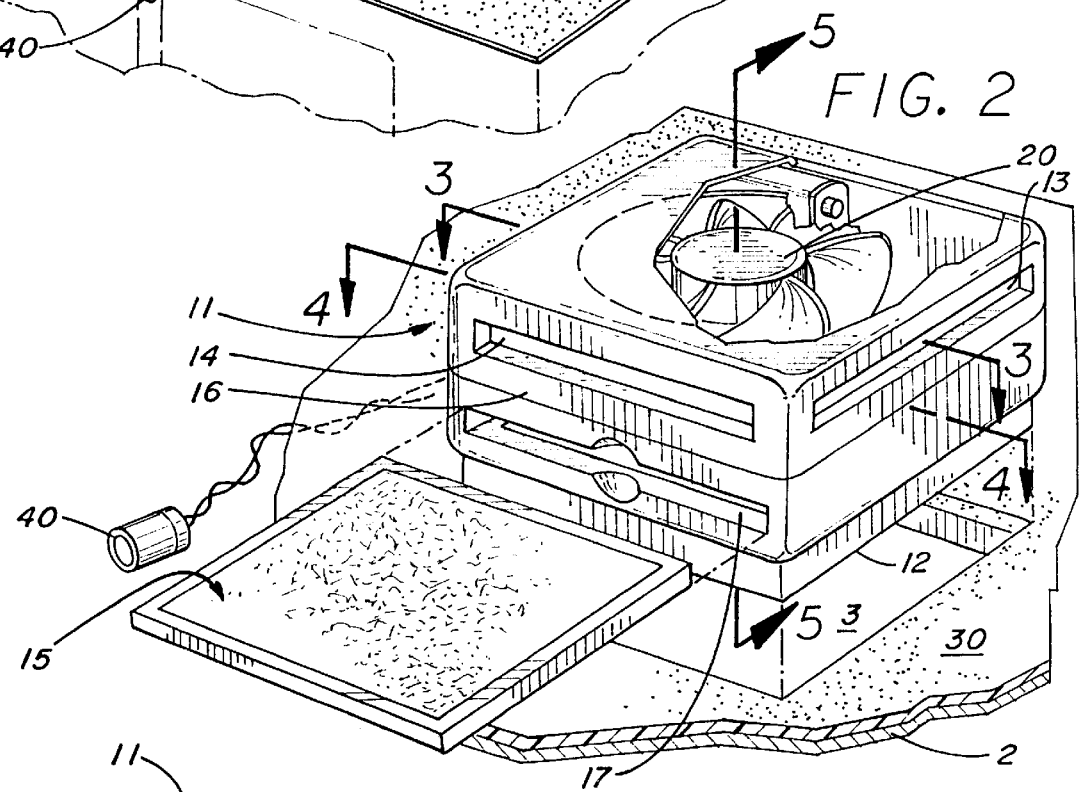
FIG. 2 is an enlarged view of a portion of the view of FIG. 1 showing a presently preferred embodiment of the filter retention means.
Figure 3:
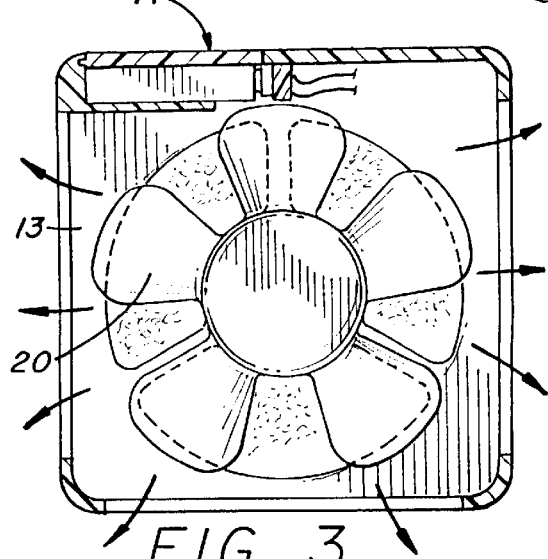
FIG. 3 is a sectioned view of the enclosure of FIG. 2 taken along the line 3—3.
Figure 4:
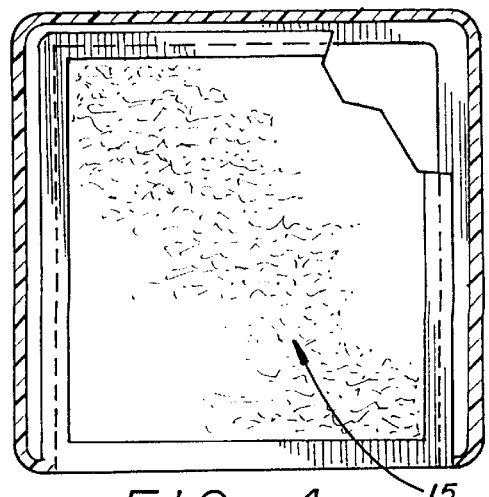
FIG. 4 is a sectioned view of the enclosure of FIG. 2 taken along the line 4—4.

The drawings illustrate the preferred embodiments of the filter system to be installed and used to improve an animal habitation. In an exemplary use, the system is used to deodorize a cat house 1 with a litter box. Although the example chosen is the improvement of a habitation for cats, it may be used to deodorize the habitation structures of other animals both domestic and wild held in captivity. Many animal habitation structures have, as in the drawings, a roof 2 provided with a ventilation hole 3. If no hole 3 exists, one may be constructed, so the system is easily adapted to retrofit any animal habitations known to be presently on the market.

As seen in FIG. 1, the filter system has a housing 11 provided with an inlet 12 and an outlet 13 which in FIG. 1 takes the form of apertures 14 in the walls 16 of the housing 11. Within the housing 11 there is an electric fan 20, here a hub motor fan, positioned to move a current of air from the inlet 12 through a filter 15 which may be of any suitable material, preferably activated charcoal, and out of the housing through apertures 14. One preferred embodiment of the electric fan 20 is a tube axial AC fan with an air flow of 30 CFM. The Sunon company makes a 3.15", 115 VAC, 60 Hz, 30 CFM, tube axial AC fan, model no. SF 11580A, which can be used for the electric fan 20. Another preferred embodiment of the electric fan 20 is a DC fan. Use of a DC fan enables the device to run on battery power. The Sunon company makes a 3.15", 12 VDC, 36 CFM, brushless DC fan, model number KDE1208PTS1-6, which can be used for the electric fan 20. These two embodiments will move a current of air sufficient to deodorize a typical enclosed cat litter box 1. However, due to the variety of different sized animal housings available, electric fans 20 of different sizes and air flow capacities can be employed to circulate a current of air to deodorize those housings. A horizontal slot 17 with guide rails 19 is provided in the housing walls 16 for removably receiving the filter 15. If more than one filter type is desired, provision may be made for a second filter the size of the slots 17 or by making a second slot 17 (not shown). There is a wide variety of commercially available charcoal air filters for cat litter boxes which can be used to make the filters 15. One product which can be used to make the filters 15 is the Zeolite Air Filter produced by VanNess, 400 Brighton Road, Clifton, N.J. 07013.

An important feature of the invention is the means for communication of the inlet aperture 12 and the ventilation hole 3 in the roof. The two may or may not register exactly, and it is an advantage of this invention that exact registration is not required.

The means for accomplishing this result is a moldable, flexible plastic membrane 30, The membrane is affixed to the inlet 12 of the exhaust system and rests upon the roof 2, where it surrounds, but is not affixed to, either the roof 2 or the ventilation hole 3 in the roof. Notwithstanding the lack of fixation, the membrane 30 forms a substantially air-tight seal with the roof 2 by merely lying in place. The membrane, because of its moldability and weight, is capable of conforming to the surface contour of almost any roof to form a substantially air tight seal with the roof The preferred material for making the membrane is a polyurethane rubber mat.

Both foam and solid rubbers can be used to make the moldable, flexible plastic membrane 30. Preferred materials for making this membrane 30 include neoprene foam rubber, commonly used as wet suit material, or natural foam rubber, often used for making computer mouse pads. Latex foam rubber and polyurathane foam rubber, both of which are typically used as moldable cushioning materials, may also be used to make the moldable membrane 30. A one quarter inch think natural foam rubber sheet measuring eight inches wide and twelve inches long is one preferred embodiment of the membrane 30. This embodiment will fit a typical enclosed cat litter box 1. However, due to the variety of different sized animal housings available, foam rubber sheets of different thicknesses, widths, and lengths will be employed to make the membrane 30. It is also possible to construct this moldable plastic membrane 30 out of a very thin sheet of solid rubber material. It is critical that this thin sheet of solid rubber forming the membrane 30 be thin enough such that gravity will pull the thin rubber sheet against the roof 2 of the animal housing 1 to substantially form an air seal. Solid neoprene rubber or solid natural rubber are preferred embodiments for a membrane 30.

With the exhaust system held in place by means of the membrane, the system operates as follows. The electric fan moves air from inside the animal habitation structure through the ventilation hole 3 and exhaust system inlet aperture 12 through the filter and out of the exhaust system through outlet apertures 14, thence to the ambient atmosphere in the room or outside air.

Preferably, a manual switch is provided to turn the fan 20 on and off for extended operation to keep the habitation fresh. However, there may be also provided in connection with the exhaust system a sensing means operably connected to the electric fan 20 for detecting the presence of an animal entering and leaving the habitation, for example to use a litter box. The sensing means may be set to activate the electric fan when an animal is present in the habitation or actually using the litter box and deactivate the fan when the animal leaves the site. An infra-red motion detector is one preferred embodiment of the sensing means 40. When this infra-red motion detector senses the presence of a moving animal within the housing structure 1, the electric fan 20 is activated. One commercially available infra-red motion detector which can be used to make the sensing means 40 is the PIR Motion Detector, model no. 80-300, made by DataKit, LKG Industries, Inc. Rockford, Ill. 61109.

An alternate embodiment of the invention is shown in FIGS. 6 and 7. In this embodiment of the invention, filters 15 are removably received in slots 17A on roof 11A of housing 11.

We claim:

1. In an animal housing structure having a roof provided with a ventilation hole, a litter box filter system comprising:
   a) an exhaust system having an inlet and an outlet, and further comprising:
      1. a fan housing;
      2. an electric fan mounted in the fan housing;
      3. an exhaust filter;
      4. a slot in the fan housing for removably receiving the exhaust filter; and
   b) adapting means connecting the inlet to the exhaust system to the roof, the adapting means being fixed to the inlet of the exhaust system and removably resting upon the roof, said adapting means extending a distance beyond said inlet and covering the ventilation hole to form substantially an air seal with the roof, whereby responsive to the electric fan, air may freely flow from the ventilation hole through the adapting means into the exhaust system, through the ventilation hole and through the exhaust filter.

2. A litter box air filter system as described in claim 1, wherein the adapting means is capable of conforming to the surface contour of the roof, the adapting means is capable of conforming to a different surface contour of a different roof, whereby the adapting means forms an air tight seal when positioned on the roof or the different roof, thereby enabling the litter box air filter system to adapt and function on different types of litter boxes.

3. A litter box air filter system as described in claim 2, wherein the enclosed exhaust system further comprises sensing means connected to the electric fan for detecting an animal in the litter box, and sensing means activates the electric fan when an animal is present in the litter box and deactivates the fan when the animal leaves the litter box.

4. A litter box air filter system as recited in claim 3, wherein the adapting means is comprised of a polyurethane rubber mat, the polyurethane rubber mat has a hole through which air may flow, the polyurethane rubber mat is positioned over the roof such that the hole is positioned over the ventilation hole thereby enabling air to flow from the ventilation hole into the enclosed exhaust system.

* * * * *